Patented Aug. 23, 1949

2,479,662

UNITED STATES PATENT OFFICE 2,479,662

SYNTHESIS OF AMINO ACIDS

Noel F. Albertson, F st Greenbush, and Sydney Archer, Albany, N. Y., assignors, by mesne assignments, to Winthrop-Stearns Inc., New York, N. Y., a corporation of Delaware No Drawing. Application December 19, 1944, Serial No. 568,938

10 Claims. (Cl. 260—465)

This invention relates to a new and improved method of preparing α-amino acids and to new and useful intermediates thereof. In particular, it relates to the synthesis of α-amino acids by a novel process employing esters of lower acylaminocyanoacetic acids.

This application is a continuation-in-part of our application Serial No. 555,404, filed September 22, 1944, now Patent #2,420,641, entitled Improved amino acid synthesis, in which it was shown that histidine may be synthesized by the condensation of 4-(chloromethyl)-imidazole with esters of acylaminocyanoacetic acids, followed by hydrolysis and decarboxylation. We have now found that this specific example can be applied to other aliphatic halides and therefore that we have produced an improved general method for the synthesis of α-amino acids.

There are numerous procedures for preparing α-amino acids which are well known (cf. Schmidt, "Chemistry of Amino Acids and Proteins," 1938, pp. 38–98). Among these are the common and widely applicable Strecker cyanohydrin method, the amination of α-halo acids, the Erlenmeyer azlactone synthesis, the reductive amination of α-keto acids, and the halogenation of substituted malonic esters followed by amination and hydrolysis. All these synthetic approaches suffer certain disadvantages which are widely recognized. These include low yields, difficultly obtained reagents, or expensive and tedious isolations of desired products. An improved synthetic method of widely applicable scope is desirable.

We have discovered that esters of lower acylaminocyanoacetic acids, which have recently become readily available at low cost (U. S. Patent No. 2,393,723 of January 29, 1946, to B. F. Tullar) react readily with aliphatic halides of the type RR'CHX, where R is any group which is itself unaffected by alkaline agents and R' is lower alkyl or hydrogen, to form in good yield condensation products which may be readily hydrolyzed and decarboxylated to form α-amino acids. The following reactions serve as an illustration:

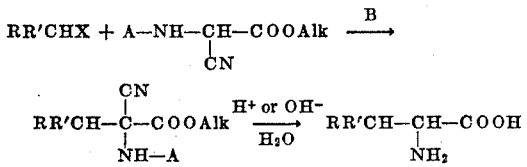

R being any group which is not attacked by alkaline condensing agents such as alkali metal alcoholates, A being a lower acyl group, R' being a lower alkyl group or hydrogen, B being an alkaline condensing agent, X being a halogen and Alk being a lower alkyl group.

We have also discovered that the reaction of esters of lower acylaminocyanoacetic acids with aliphatic halides of the type RR'CHX enjoys certain important advantages over other similar reactions commonly used in the synthesis of α-amino acids. Other esters which have been used include those of acetamidomalonic, benzamidomalonic and phthalimidomalonic acids. The products of the condensation of substituted methyl halides of the type RR'CHX with ethyl cyanoaceturate, for example, are crystalline compounds which are readily isolated and usually obtained in a state of purity. This is of considerable value in commercial syntheses. In contrast, the product resulting from the reaction of the same halides with ethyl acetamidomalonate are generally lower melting, frequently being oils, or very low melting solids which are difficult to handle, troublesome to isolate and often impure. A case of interest is the condensation of β-chloroethyl methyl sulfide with ethyl cyanoaceturate. The reaction proceeds smoothly to form a pure crystalline product which may be further treated to produce methionine. When, on the other hand, the same chloride reacts with ethyl acetamidomalonate the product is oily and hence difficult to isolate and purify. When it is converted to methionine, an amino acid of lower purity results. When ethyl benzamidomalonate, which is often used in place of ethyl acetamidomalonate, is a reagent, the condensation products are generally oils, involving the disadvantages outlined above.

A further advantage of the use of acylaminocyanoacetic esters over other related esters is seen in the hydrolysis of their condensation products with substituted methyl halides. The products from the acylaminocyanoacetic ester may be hydrolyzed and decarboxylated in one step in either acid or alkaline media. It is not possible, however, to hydrolyze and decarboxylate in one process the condensation products of the other esters in alkaline solution. Consequently acid must be used, either for the complete process or for the decarboxylation, in all cases where substituted acetamidomalonic, benzamidomalonic, or phthalimidomalonic esters are to be converted to α-amino acids. This is often a definite disadvantage because certain important amino acids are sensitive to acid. An important example is that of methionine. It is known that under the influence of acids, this amino acid is demethylated and converted into homocystine or the thiolactone of homocysteine [J. Biol. Chem., 99, 135 (1932);

106, 451 (1934)]. Furthermore it is often desirable in commercial processes to avoid the use of hot acid, as these hydrolyses and decarboxylations require, for such use necessitates expensive acid-resistant equipment. Alkaline solutions, which may be used for the one-step hydrolysis and decarboxylation of substituted acylaminocyanoacetic esters, are generally to be preferred in commercial processes.

Still another advantage that the lower acylaminocyanoacetic esters hold over the esters of benzamidomalonic and phthalimidomalonic acids is the fact that hydrolysis does not form insoluble acids or derivatives thereof which must be removed. Benzoic and phthalic acids are formed from the hydrolysis of benzamidomalonic and phthalimidomalonic esters, respectively, and phthalhydrazide is formed if one chooses to cleave the phthalimido group with hydrazine. The removal of these contaminants entails added cost.

We have discovered that the halogen compound RR'CHX may vary widely in its structure. It may be either primary or secondary, as for example ethyl iodide or iso-propyl bromide. It may contain any of the halogens. The groups R and R' attached to the halogen-bearing carbon atom may be any of the organic radicals which in themselves are not attacked by alkaline condensing agents. They may be heterocyclic, such as 4-(chloromethyl)imidazole disclosed in our aforesaid co-pending application Serial No. 555,404; they may be aryl, alkyl, or unsaturated alkyl or alkenyl; they may contain interrupting hetero atoms, as for example sulfur in $\beta$-methylmercaptoethyl. Indeed, the halogen compound may be any reactive non-tertiary organic halide. This term is understood by those skilled in the art to mean a compound in which the halogen atom is bound to a primary or secondary carbon atom which carries organic groups which do not decrease the ease with which the halogen may be replaced by other organic radicals.

Alkaline condensing agents as used in this specification mean any of the alkali metal or alkaline earth metal alcoholates or alkoxides, alkali metals, alkali metal amides, and alkali metal triarylmethides, as well as other similar agents commonly used to replace an active methylene hydrogen by a metal.

The ester and acyl portions of the lower acylaminocyanoacetic esters are so chosen that upon hydrolysis these groups form water-soluble alcohols and acids. Thus the esters are those of methyl, ethyl, propyl or iso-propyl alcohol. The acyl groups are those derived from formic, acetic, propionic or butyric acids. Therefore, on hydrolysis the alcohol and acid produced are readily removed, due to their properties of water solubility and/or volatility.

We prefer to use ethyl cyanoaceturate as the acylaminocyanoacetic ester because of its cheapness and availability, although other esters of cyanoaceturic acid and other lower acylaminocyanoacetic acids are equally suitable. A preferred embodiment of our invention is the condensation of ethyl cyanoaceturate with a substituted methyl halide in dry ethanol under the influence of an alkaline condensing agent such as sodium or potassium ethoxide. The mixture is refluxed until condensation is complete. The solvent may then be removed or the solution may be poured into water. The crystalline condensation product which results may be hydrolyzed and decarboxylated by treatment with dilute aqueous alkali or with strong acids such as hydrochloric or hydrobromic. The desired amino acid is isolated from the alkaline or acid solution by the usual methods.

Our invention is further illustrated by the following examples, without, however, being limited thereto.

Example 1

A. 17 grams of ethyl cyanoaceturate (0.1 mole) are added to 170 cc. of dry ethanol in which 2.3 g. (0.1 mole) of sodium have been dissolved. This solution is treated with 11 g. (0.1 mole) of $\beta$-chloroethyl methyl sulfide in 12 cc. of dry benzene and then refluxed overnight. Sodium chloride separates. The mixture is poured into 400 g. of ice and water. The ethyl 2-acetamido-2-cyano-4-methylmercaptobutyrate rapidly crystallizes. It is filtered and taken up in 45 cc. of 95% ethanol, charcoaled and again filtered. To the filtrate, 100 cc. of ice water are slowly added. The product so obtained, when dried at 85°, weighs 14.4–15.0 g. (59–61.5% yield) and melts at 115–117°.

Anal. Calcd. for $C_{10}H_{16}O_3N_2S$: N, 11.47. Found: N, 11.62.

B. 6 grams of the ethyl 2-acetamido-2-cyano-4-methylmercaptobutyrate are refluxed in a solution of 7 g. of sodium hydroxide in 50 cc. of water for 22 hours. The solution is made acid to Congo red by the addition of 20 cc. of concentrated hydrochloric acid. The solution is filtered and the filtrate is concentrated to dryness in vacuo. The residue is extracted with a total of 50 cc. of anhydrous ethanol. The alcoholic solution is charcoaled and filtered. Methionine is precipitated by the addition of 9–10 cc. of pyridine. The product, after chilling, is collected by filtration and dried. The yield is 3.01 g. (82.4%) of methionine.

The benzoyl derivative, on comparison with an authentic sample, is identical with benzoylmethionine.

Example 2

A. 10.9 grams (0.05 mole) of ethyl cyanoceturate are dissolved in a solution containing 1.15 g. (0.05 mole) of sodium in 100 cc. of absolute ethanol. To this, 8.2 g. (0.065 mole) of benzyl chloride are added dropwise with stirring while the mixture is heated on the steam bath. The solution rapidly becomes neutral to litmus and after 1½ hours is poured into 200 cc. of boiling water. The solution is charcoaled and filtered. The filtrate is cooled and the product removed by filtration. After drying at 80°, the ethyl 2-acetamido-2-cyano-3-phenylpropionate weighs 10.8 g. (83% yield) and melts at 127–130°. A sample recrystallized from ethanol melts at 132°.

Anal. Calcd. for $C_{14}H_{16}O_3N_2$: N, 10.75. Found: N, 10.57.

B. 2.6 grams (0.01 mole) of ethyl 2-acetamido-2-cyano-3-phenylpropionate are refluxed for 8 hours in 8 cc. of 48% hydrobromic acid. The resulting light yellow solution is charcoaled and filtered. Concentrated ammonium hydroxide is added until the isoelectric point is reached. Then 35 cc. of 95% alcohol is added and the product is cooled. The phenylalanine is filtered, washed and dried. The yield is 0.925 g. (56%).

C. To 12 grams of sodium hydroxide in 120 cc. of water are added 11.7 g. (0.045 mole) of ethyl 2-acetamido-2-cyano-3-phenylpropionate. The solution is refluxed for 24 hours, during which time ammonia is evolved. The solution is cooled and 5 cc. of glacial acetic acid is added. The solution is filtered and then brought to the isoelectric point by the further addition of acetic acid. The product is cooled, then filtered, washed and dried. The yield of phenylalanine is 7.03 g. (67%).

*Example 3*

A. 17 grams (0.1 mole) of ethyl cyanoaceturate are dissolved in a solution of 2.3 g. (0.1 mole) of sodium in 200 cc. of absolute alcohol. To this are added 11.8 g. (0.13 mole) of methylallyl chloride and the solution is refluxed overnight. It is then treated with charcoal and filtered. About 100 cc. of alcohol are removed under reduced pressure and the residual solution is poured into 450 cc. of boiling water. Upon cooling and filtering the total yield is 15.6 g. (70%) of ethyl 2 - acetamido-2-cyano-4-methyl - 4 - pentenoate melting at 77–81°. A sample recrystallized from dilute alcohol melts at 79.5–81°.

Anal. Calcd. for $C_{11}H_{16}O_3N_2$: N, 12.49. Found: N, 12.06.

B. Ethyl 2-acetamido-2-cyano - 4 - methyl-4-pentenoate (6.3 g.) is refluxed for 20 hours with a solution of 7.9 g. of sodium hydroxide in 80 cc. of water. The mixture is made acidic with concentrated hydrochloric acid and evaporated to dryness under vacuum. The residue is extracted with absolute ethanol. The amino acid is precipitated with pyridine. Methallylglycine is isolated in a yield of 1.9 g. (53%), melting at 208–211°.

*Example 4*

A. 17 grams (0.1 mole) of ethyl cyanoaceturate in 200 cc. of absolute alcohol containing 2.3 g. (0.1 mole) of sodium are treated with 15.7 g. (0.13 mole) of allyl bromide, as in Example 3, The yield of ethyl 2-acetamido-2-cyano-4-pentenoate is 12 g. (57%); M. P. 86–88.5°.

Anal. Calcd. for $C_{10}H_{14}O_3N_2$: C, 57.01; H, 6.70; N, 13.32. Found: C, 57.07; H, 6.69; N, 13.12.

B. 6.3 grams (0.03 mole) of ethyl 2-acetamido-2-cyano-4-pentenoate are refluxed for 10 hours with 50 cc. of 10% sodium hydroxide. The pale yellow solution is charcoaled, filtered and made acid with excess concentrated hydrochloric acid. The solution is taken to dryness and extracted with absolute ethanol. Addition of pyridine to the extract precipitates fine white crystalline allylglycine, M. P. 243–245°.

The benzoyl derivative of this sample of allylglycine melts at 108–109°.

*Example 5*

A. 17 grams (0.1 mole) of ethyl cyanoaceturate are dissolved in 200 cc. of absolute alcohol containing 2.3 g. (0.1 mole) of sodium in solution. Then 10.3 cc. (0.11 mole) of isopropyl bromide is added and the solution is refluxed for 16 hours. It is charcoaled and filtered. The filtrate is concentrated to about one-fourth its volume under vacuum and then poured on ice. The solid is collected by filtration and dried at 80°. The yield is 10.8–12.0 g. (51–57%) of ethyl 2-acetamido-2-cyano-3-methylbutyrate of M. P. 145–147°. This material may be used directly in parts B or C. A sample, recrystallized from aqueous ethanol for analysis, melts at 149°.

Anal. Calcd. for $C_{10}H_{16}O_3N_2$: N, 13.20. Found: N, 13.52.

B. 10.6 grams (0.05 mole) of ethyl 2-acetamido-2-cyano-3-methylbutyrate are dissolved in 25 cc. of 48% hydrobromic acid. The solution is refluxed for 2½ hours, charcoaled, filtered and evaporated to dryness under vacuum. The residue is dissolved in 12 cc. of water and concentrated ammonium hydroxide is added to pH 6. 50 cc. of 95% alcohol are added and the product placed in the refrigerator overnight. After filtration, washing and drying there is obtained 2.93 g. of valine (50% yield), M. P. 279–284° (dec.).

C. To a solution of 14 g. of sodium hydroxide in 140 cc. of water are added 10.6 g. (0.05 mole) of ethyl 2-acetamido-2-cyano-3-methylbutyrate. The mixture is refluxed for 23 hours, then charcoaled and filtered. 50 cc. of concentrated hydrochloric acid are added and the solution taken to dryness. The dry residue is extracted with five 25-cc. portions of absolute alcohol. The solution is charcoaled and the filtrate is concentrated to 50 cc. under vacuum. Pyridine (5 cc.) is added and the product is placed in a refrigerator overnight. It is then filtered and washed with absolute alcohol. The yield is 2.99 g. (51%) of valine, M. P. 285° (dec.).

The benzoyl derivatives, made of the products from B and C, are identical with authentic benzoylvaline.

*Example 6*

A. Ethyl cyanoaceturate (170 g., 1 mole) is condensed with 154 g. (1 mole) of ethyl iodide by the method given in Example 5. Ethyl 2-acetamido-2-cyanobutyrate is isolated in 88% yield (176 g.) in suitable purity for further reaction. A sample recrystallized from water melts at 133.5–135°.

Anal. Calcd. for $C_9H_{14}N_2O_3$: C, 54.54; H, 7.12. Found: C, 54.23; H, 6.60.

B. 9.9 grams (0.05 mole) of ethyl 2-acetamido-2-cyano-butyrate are refluxed for 8 hours in 40 cc. of 48% hydrobromic acid. The amino acid is isolated as in Example 5, part B. The yield of α-aminobutyric acid is 4.24 g. (82%), melting at 261–264°.

The benzoyl derivative of α-aminobutyric acid melts at 141–142°. The chloroacetyl derivative melts at 129°.

What we claim is:

1. The process which comprises reacting an ester of a lower acylaminocyanoacetic acid with a compound of the formula RR′CHX, where R is a member of the group consisting of hydrocarbon radicals and mono-thia-hydrocarbon radicals, R′ is a member of the group consisting of alkyl and hydrogen radicals, and X is halogen, in the presence of an alkaline condensing agent.

2. The process which comprises reacting an ester of cyanoaceturic acid with a compound of the formula RR′CHX, where R is a member of the group consisting of hydrocarbon radicals and mono-thia-hydrocarbon radicals, R′ is a member of the class consisting of alkyl and hydrogen radicals, and X is halogen, in the presence of an alkaline condensing agent.

3. The process of preparing an α-amino acid which comprises reacting an ester of a lower acylaminocyanoacetic acid with a compound of the formula RR′CHX, where R is a member of the group consisting of hydrocarbon radicals and mono-thia-hydrocarbon radicals, R′ is a member of the group consisting of alkyl and hydrogen radicals, and X is halogen, in the presence of an alkaline condensing agent, and hydrolyzing and decarboxylating the resulting product by heating it in an alkaline medium.

4. The process of preparing an α-amino acid which comprises reacting an ester of cyanoaceturic acid with a compound of the formula RR'CHX, where R is an alkyl radical, R' is a member of the group consisting of alkyl and hydrogen radicals, and X is halogen, in the presence of an alkaline condensing agent, and hydrolyzing and decarboxylating the resulting product by heating it in an alkaline medium.

5. The process of preparing methionine which comprises reacting ethyl cyanoaceturate with β-chloroethyl methyl sulfide in the presence of an alkaline condensing agent and hydrolyzing and decarboxylating the resulting product by heating it in an alkaline medium.

6. The process of preparing phenylalanine which comprises reacting ethyl cyanoaceturate with benzyl chloride in the presence of an alkaline condensing agent and hydrolyzing and decarboxylating the resulting product by heating it in an alkaline medium.

7. A compound having the formula

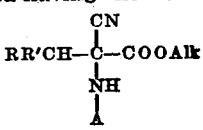

where R is a member of the group consisting of hydrocarbon radicals and mono-thia-hydrocarbon radicals, R' is a member of the group consisting of alkyl and hydrogen radicals; A is a lower acyl group and Alk is alkyl.

8. Ethyl 2-acetamido-2-cyano-3-phenylpropionate, having the formula

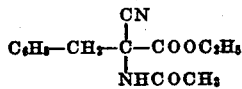

and melting at 132° C.

9. Ethyl 2-acetamido-2-cyano-4-methylmercaptobutyrate, having the formula

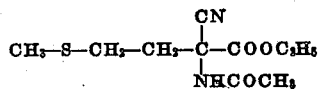

and melting at 115–117° C.

10. Ethyl 2-acetamido-2-cyano-3-methylbutyrate, having the formula

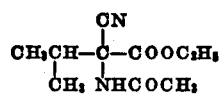

NOEL F. ALBERTSON.
SYDNEY ARCHER.

REFERENCES CITED

The following references are of record in the file of this patent:

UNITED STATES PATENTS

| Number | Name | Date |
|---|---|---|
| 2,420,641 | Albertson et al. | May 20, 1947 |

FOREIGN PATENTS

| Number | Country | Date |
|---|---|---|
| 417,930 | Great Britain | Oct. 16, 1934 |

OTHER REFERENCES

Ingold et al., Journ. Chem. Soc. (London), vol. 119, pp. 1222–1231 (1921).

Cherchez et al., Bull. Soc. chim de France (4) vol. 43 p. 932 (1928).

Locquin et al., Bull. Soc. chim de France (4) vol. 47, pp. 1379–1388 (1930).

Barger et al., Biochem. Jour. vol. 25, pp. 997–1000 (1931).

Redemann et al., Jour. Biol. Chem. vol. 130, pp. 341–348 (1939).

Synder et al., Jour. Am. Chem. Soc. vol. 65, pp. 2211–2214 (1943).

Patterson et al. Jour. Biol. Chem. V. III, pp. 393–398.